July 15, 1969  J. L. WALLACE, JR  3,456,079
PULSE DISTORTION MEASURING EQUIPMENT
Filed June 17, 1966

INVENTOR
JACOB L. WALLACE, JR.

BY *Tipton D. Jennings*
ATTORNEY

United States Patent Office 3,456,079
Patented July 15, 1969

3,456,079
PULSE DISTORTION MEASURING EQUIPMENT
Jacob L. Wallace, Jr., Springfield, Va., assignor to The Susquehanna Corporation, a corporation of Delaware
Filed June 17, 1966, Ser. No. 558,378
Int. Cl. H04l 25/02
U.S. Cl. 178—69                                          7 Claims

ABSTRACT OF THE DISCLOSURE

An example of the pulse distortion measuring equipment is a distortion monitor which employs a one-shot to drive a timing circuit. The one-shot is triggered by each input transition and by an internally-generated pulse which occurs at each ideal one-half pulse point. Each time the one-shot is triggered the timing circuit begins a timing cycle. Any time the one-shot is triggered before an existing timing cycle terminates, an indication of distortion is effected. By examining each transition for distortion, this monitor functions on a start-stop basis; yet, short-pulse techniques are utilized in the actual distortion measurement.

---

The present invention relates in general to pulse distortion measuring equipment, and, more particularly, to apparatus for measuring and indicating distortion of marking and spacing pulses in code signals such as those used in telegraph or data transmission systems.

For effective control and troubleshooting of circuits of the type encountered in telegraph and data transmission systems employing coded trains of impulses, it is most helpful to be able to detect the existence of distortion in such impulses, because distortion can affect the reliability of the operation of the system components. A common feature of each of these types of distortion is that the marking or spacing pulses are lengthened or shortened by the distortion either in a uniform or a random manner. By measuring the pulses by comparing, in some way, the shortest pulse of a series of pulses with a standard or unit pulse length, the amount of distortion can be discerned. This technique of measuring the shortest pulse affords a means of detecting the basic types of telegraph signal distortion with a reasonable sampling of pulses. It has been found that as long as the signals do not exceed a given amount of distortion, they are sufficiently intelligible to provide reliable operation of the system equipment, so that test equipment which reliably monitors the signals to ensure that they do not exceed a particular amount of distortion, is usually adequate.

In copending patent application Ser. No. 348,418, filed Mar. 2, 1964, now U.S. Patent No. 3,257,509, and assigned to the assignee to the present invention, there is shown novel pulse distortion measuring equipment which uses a single channel to monitor all incoming pulses to determine whether distortion is within a prescribed range, regardless of the type of pulse distorted, e.g., marking or spacing. While this equipment has been proven most adequate and reliable in use, its short-pulse operation prevents detection of distortion in the interval when more than one of the same sense pulse (e.g., marks or spaces) occur consecutively. This is because the short-pulse technique is based upon detection of pulses of less than a unit pulse length which does not normally enable detection of distortion in a pulse condition which extends past a unit pulse length. Furthermore, certain telegraph characters which are composed only of several sequences of two or more of the same sense pulses, such as the Baudot letters "O" and "V," avoid distortion detection altogether.

Start-stop distortion measuring equipment would enable detection of distortion where several of the same sense pulses are grouped together because start-stop techniques measure each actual pulse transition with reference to the ideal transition point. However, start-stop equipment is generally complex by comparison with short-pulse equipment and heretofore has been too costly to be a satisfactory replacement.

The present invention overcomes the aforementioned disadvantages and it is an object of the present invention to provide improved pulse distortion measuring equipment which functions on a start-stop basis, yet retains the simplicity and reliability of a short-pulse monitor.

Another object of the present invention is to provide improved pulse distortion measuring equipment which functions on a start-stop basis but utilizes short pulse techniques in the actual distortion measurement.

Another object of the present invention is to provide such apparatus having a single measuring channel for measuring different types of input pulses, such as marking and spacing pulses found in telegraph and data signals.

A further object of the present invention is to provide an improved monitor which operates on a start-stop basis for detecting distortion in a pulse train during distortion measurement periods by utilizing both the input pulse transitions and generated reference signals in a short-pulse measurement procedure.

Other objects, advantages, and capabilities of the present invention will become apparent by a reading of the following detailed description in conjunction with the accompanying drawings, in which.

In general, the present invention covers a device for monitoring various level telegraph and data code signals at different transmitting speeds to determine whether distortion greater than a predetermined amount is present. This predetermined amount is established by a timing circuit. In response to the code train input, signals are generated internally and are timed to occur at the ideal one-half pulse points for the pulses in the code train. These signals are used together with the transitions of the code train pulses to trigger a monostable means. The monostable means actuates the timing circuit to initiate a timing cycle. If a generated signal or a transition triggers the monostable means before completion of an existing timing cycle in the timing circuit, a signal indicaitve of distortion greater than the predetermined amount is transmitted to an indicating or alarm circuit.

Figure 1:
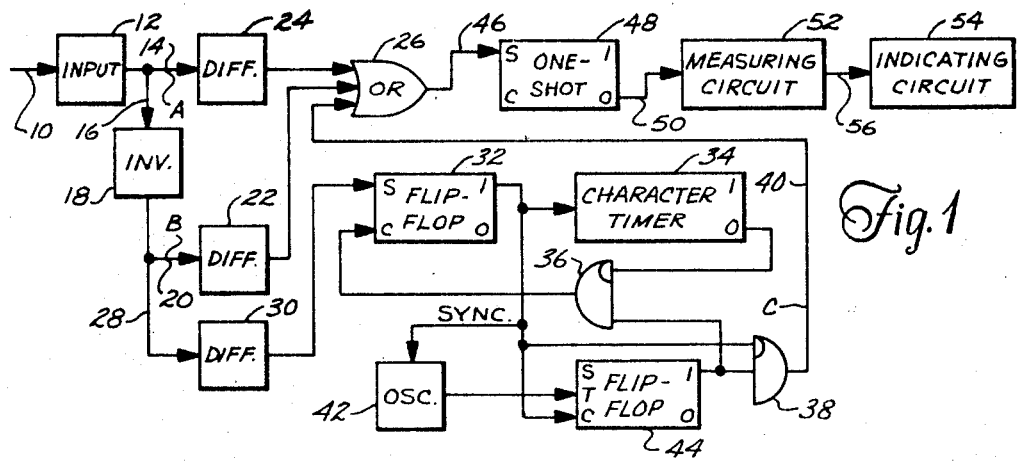
FIGURE 1 is a block diagram of the preferred embodiment of the invention.

Referring now to FIGURE 1 which shows a block diagram of the present invention, the input signals are applied on line 10 to the input circuitry 12. This input circuit 12 is conventional in construction and contains the necessary biasing, filtering, inverting, and amplifying circuitry for handling the various types of input signals which can be applied. An example of this type of input circuit is shown in the aforementioned copending application, Ser. No. 348,418, now U.S. Patent No. 3,257,509. The output of input circuit 12 is applied to line 14 and is a replica of the pulse train applied on line 10. This waveform is shown in line A of FIGURE 2. Line 16 applies the signal on line 14 to inverter 18 whose output is the mirror image of signal A and is shown in line B of FIGURE 2. This output of inverter 18 is applied by line 20 to differentiating circuit 22. Line 14 is connected to a second differentiating circuit 24 and the output of both of these two differentiating circuits is applied to OR gate 26.

Output line 20 is also connected to a line 28 leading to a differentiating circuit 30 whose input, in turn, is connected to the set side of flip-flop 32. The output of flip-flop 32 is connected to a character timer 34. Character timer 34 and flip-flop 32 establish distinct timing periods when measurements of distortion occur. With start-stop telegraph signals, the character timing period begins with the initiation of the start pulse of a character and terminates during the stop pulse, for example, after 50% of the first stop element has elapsed. Character timer 34 can be of conventional construction and comprise essentially a one-shot multivibrator, having an RC timing circuit which is variable to provide a character timing period whose duration is prescribed by the character length of the input signals. The zero output of the character timer 34 is connected to the inhibit input of a gated differentiating circuit 36. The output of differentiator 36 is connected to the clear input of flip-flop 32. The one side of this flip-flop is also connected to the inhibit input of gated differentiator 38.

Figure 2:
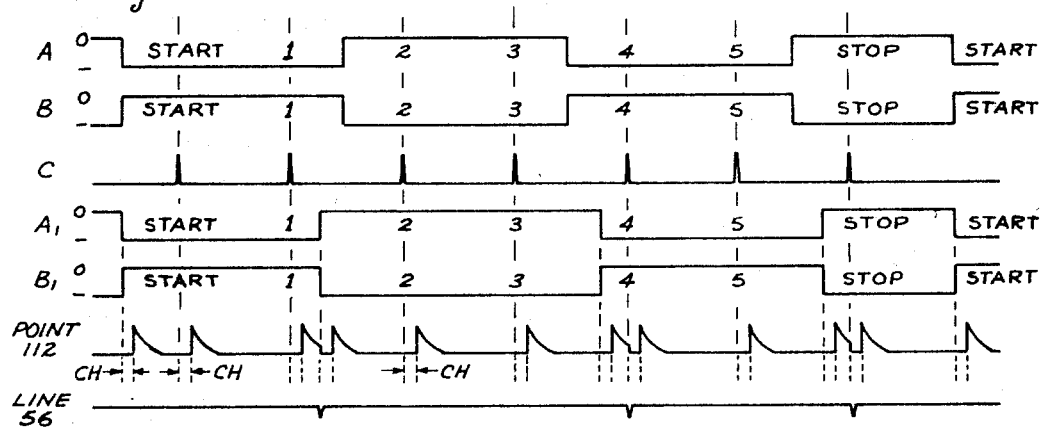
FIGURE 2 is a series of waveforms which appear at prescribed points in the system and which are referred to in the description to aid in an understanding of the invention.

The combination of oscillator 42 and flip-flop 44 generate signals which occur at the ideal 50% or one-half pulse points for the input pulses. Oscillator 42 is synchronized by the one side of flip-flop 32 at the initiation of the character timing period. This same synchronizing signal also clears flip-flop 44. Oscillator 42 is adjustable to run at twice the speed of the input signal. Therefore, after synchronization, oscillator 42 applies a triggering pulse at each ideal pulse point and each ideal 50% or one-half pulse point to the toggle input of flip-flop 44. The first triggering pulse occurs at the ideal one-half pulse point of the start pulse. Flip-flop 44 is therefore set at each ideal one-half pulse point and cleared at each ideal pulse point. Its output is applied to gated differentiator 38. The output of differentiator 38, which is represented in line C of FIGURE 2, is connected to OR gate 26 by line 40. The output of flip-flop 44 is also connected to differentiator 36.

The output of OR gate 26 is connected by line 46 to the set side of a variable monostable trigger means, here shown, by example, as one-shot 48. The output of one-shot 48 is connected by line 50 to measuring circuit 52 whose output is connected to an indicating or alarm circuit 54 by line 56.

Figure 3:
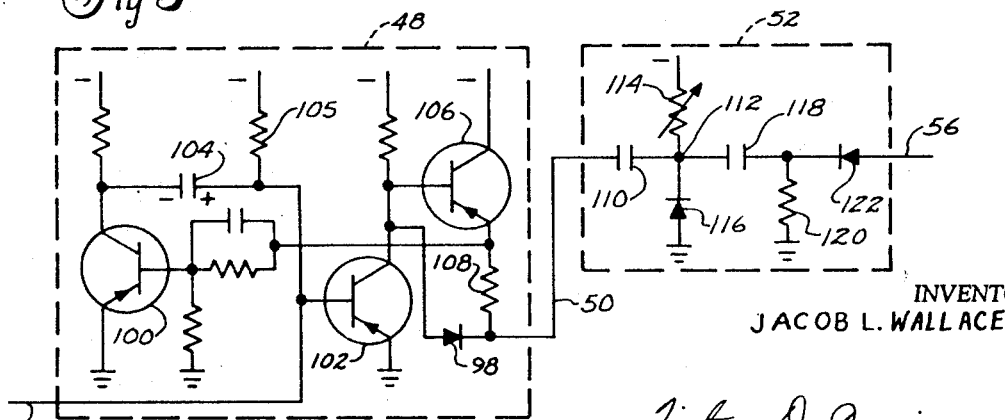
FIGURE 3 is a schematic diagram of selected blocks from the diagram of FIGURE 1.

In FIGURE 3 there is shown the schematic of one-shot 48 and the measuring circuit 52. The basic portion of the one-shot 48 is formed of two transistors, 100 and 102. Transistor 102 is conducting when one-shot is in its stable state. Transistor 100 is nonconducting and capacitor 104 is charged to the negative level present at the collector of transistor 100. The collector of transistor 102 is connected to an emitter follower circuit formed by transistor 106, diode 98 and a resistor 108 of very low value. The emitter of transistor 106 is connected to the base of transistor 100 to provide the regenerative switching action when one-shot 48 is triggered.

Output line 50 connects resistor 108 with a capacitor 110 in the measuring circuit 52. The other side of capacitor 110 is connected to junction point 112. Junction point 112 is connected to battery through a variable resistor 114 which is capable of achieving a high value of resistance, e.g., 200,000 ohms. Point 112 is connected to ground through a diode 116, and to a differentiating circuit composed of capacitor 118 and resistor 120. Diode 122 is connected to pass only negative spikes from the differentiating circuit onto line 56.

When a positive spike is applied on line 46 to the base of transistor 102, it turns this transistor off and the transistors 100 and 106 switch on. Ground is provided at the left side of capacitor 104 and the negative charge previously present on this capacitor appears as a positive charge on its right side. This capacitor discharges through resistor 105 to negative battery. The one-shot 48 stays in this semistable state until such time as the charge on capacitor 104 has decreased to the point where transistor 102 again conducts. At that time transistors 106 and 100 turn off and the one-shot 48 is now returned to its stable state.

When one-shot 48 is set in its semistable state and transistor 106 conducts, the timing cycle of the circuit 52 begins. Capacitor 110 quickly charges through a path composed of transistor 106, resistor 108, capacitor 110, junction point 112 and conducting diode 116 to ground. Because of the low value of resistor 108, capacitor 110 attains its full charge during the very brief time one-shot 48 is in its semistable state. When one-shot 48 does return to its stable state, the collector of transistor 102 rises to approximately ground potential. The left side of capacitor 110 is placed at approximately ground potential through diode 98. Because this capacitor cannot discharge immediately, the right side of this transistor and junction point 112 rises to a positive potential equal in value to approximately the negative charge. Diode 116 becomes back-biased and capacitor 110 begins to discharge through the high resistance 114 to the negative battery.

Ideally, capacitor 110 completes the charge-discharge timing cycle by discharging fully before one-shot 48 is again triggered by the arrival of the next positive spike on line 46. In the event capacitor 110 has not fully discharged when one-shot 48 is again triggered, capacitor 110 will begin to recharge. The clamping action of diode 116 causes junction point 112 to drop from a positive level to ground potential. This negative drop is differentiated by capacitor 118 and resistor 120 and passed as a negative spike through diode 122 onto line 56 to trigger the indicating circuit 54. How this sequence of events enables detection of distortion is described in the ensuing description of operation of the entire system.

With reference now to all three figures, assume that, as an example, input circuit 12 is connected by line 10 to a 60 ma., neutral, telegraph circuit. When the circuit is idle or in marking condition, a ground condition appears on line 14 and when the circuit is open or at spacing condition, a negative potential appears on line 14. This is as represented by line A in FIGURE 2. Assume also that the input rate is 60 w.p.m. (45.5 baud), and oscillator 42 is adjusted to run at twice this rate. Character timer 34 is adjustable to time out (assuming a five-level input code) between 5.5 and 6.5 unit pulses. Here, by example, it is chosen to time out just before the ideal one-half pulse point of the first stop pulse at the 6.4 pulse point. The stop element is here selected to be 1.42 pulses.

Assume that the input character shown on line A has been distorted during transmission so that it arrives in the distorted condition shown on line $A_1$. The character shown contains several types of distortions which have been selected to exceed 20%. The 20% value is here chosen as representative, and resistor 114 in measuring circuit 52 is set to monitor distortion in excess of this value. This means that capacitor 110, having been fully charged by the triggering of one-shot 48, will complete its discharge completely before one-shot 48 is again caused to trigger by the presence of a pulse having distortion equal to or less than 20%. In other words, the setting of resistor 114 is such that distortion greater than 20% will cause a triggering signal to be applied to indicating circuit 54 while pulses distorted less than 20% will not cause such indicating signal.

Because of the start-stop aspect of the present invention in which the ideal one-half pulse point is used in the distortion measurement, the timing cycle terminates, in the absence of distortion, at a point prior to the one-half pulse point by a percentage equal in value to the percentage distortion being monitored. For example, when monitoring 20% distortion, the timing cycle is initiated by an actual transition at the ideal transition point and terminates 20% prior to the one-half point. This timing cycle is thus 30% of a pulse length. At 60 w.p.m. each unit pulse is of 22 ms. duration. The timing cycle is 30% of this, or 6.6 ms. Because one-shot 48 is in its semistable state of .5 ms. when capacitor 110 is charging, the discharge time of capacitor 110 is set by resistor 114 so that it takes 6.1 ms. to occur. Alternatively, if the timing cycle is initiated at the ideal one-half pulse poiint, it terminates 20% prior ot the ideal pulse point. In practice, variable resistor 114 is normally calibrated in percent distortion to facilitate adjustment.

With the arrival of the start transition, line 14 goes negative and line 20 rises to ground. This positive excursion is differentiated at 30 and sets flip-flop 32 to begin the character timing period. This excursion is also differentiated at 22 and passes through OR gate to the set input of one-shot 48. Each differentiating circuit shown in FIGURE 1 contains a diode, connected so that only differentiated positive spikes will be passed. One-shot 48 is triggered to its semistable state and capacitor 110 in the measuring circuit 52 is immediately charged. One-shot 48 returns to its stable state and because of the ground potential placed on the left side of capacitor 110 the right side of this capacitor and also junction point 112 goes positive, shutting off diode 116 and causing discharge to begin through the high resistor 114. The waveform of the potential conditions at point 112 are shown in FIGURE 2. All of the time intervals shown by dotted lines on this waveform, some of which are labeled CH, are representative of the length of time that one-shot 48 is in its semistable state at which time capacitor 110 is being charged. Capacitor 110 completes its discharge 20% of a pulse length prior to the ideal half-pulse or 50% point of the start pulse.

When flip-flop 32 is set by the start pulse, the one output of this flip-flop goes to ground and synchronizes the oscillator 42 to its initial point and clears flip-flop 44. This output of flip-flop 32 also removes the inhibit input from gated differentiating circuit 38. Character timer 34 is also set and its zero output inhibits gated differentiating circuit 36. One-half of an ideal pulse period after being synchronized, oscillator 42 applies a triggering signal to the toggle input of flip-flop 44. This flip-flop is set and its one output goes to ground. This positive signal cannot be operated on by differentiator 36 because of the inhibit signal being applied to its inhibit input.

Differentiating circuit 38 is not inhibited and a positive spike is passed by line 40 through OR gate 26 to trigger the one-shot 48. While this one-shot is in its semistable state, capacitor 110 again accumulates its full charge; however, because this capacitor had become fully discharged before one-shot 48 was triggered, there is no output signal from measuring circuit 52. When the one-shot 48 times out and returns to its stable state, the right side of capacitor 110 and junction point 12 go positive. Capacitor 110 begins to discharge through resistor 114. Capacitor 110 becomes fully discharged 20% of a pulse length before the ideal transition point at the end of the start pulse.

The first information pulse in the illustrative input character is a space and no change occurs on lines 14 and 20. At the ideal transition point flip-flop 44 is toggled by oscillator 42 to the clear state; however, the negative signal is not passed by differentiator 38. At the ideal one-half pulse point for the first information pulse in the input character, oscillator 42 again toggles 44 to the set state. Differentiator 38 passes a positive spike to OR gate 26 which is applied on line 46 to trigger one-shot 48. Capacitor 110 is quickly charged and, when one-shot 48 switches to its stable state, begins to discharge through resistor 114. This discharge is towards a point which will occur 20% before the ideal transition point for the end of the first information pulse. However, as shown by the distorted waveform, the second pulse contains marking bias in which the actual transition is advanced by 25%. This transition occurs before capacitor 110 has become fully discharged. When the input signal goes marking and line 14 rises to ground potential, the positive excursion is differentiated by 24 and a spike is passed through OR gate 26 to trigger one-shot 48. Capacitor 110 begins to accumulate a new charge and junction point 112 drops to ground. This negative drop is differentiated by the combination of capacitor 118 and resistor 120 and a negative spike is passed by diode 122 onto line 56 (see FIGURE 2) and from there to indicating circuit 54 to trigger an alarm or effect some other type of indication. Distortion has been detected.

Capacitor 110 is again charged to its full potential during the time that one-shot 48 is in its semistable state and begins to discharge when this one-shot again returns to its stable state condition. Flip-flop 44 is toggled clear at the ideal transition point for the end of the first information pulse and is toggled to its set state at the ideal one-half pulse point of the second information pulse. Differentiating circuit 38 emits a positive spike which triggers one-shot 48 and causes capacitor 110 to charge. When one-shot 48 switches back to its stable state, this capacitor begins its discharge. At the ideal pulse point for the end of the second information pulse oscillator 42 toggles flip-flop to the clear state. At the ideal one-half pulse point for the third information pulse flip-flop 44 is toggled to its set state and differentiator 38 again emits a positive pulse which triggers one-shot 48. Capacitor 110 charges and, when one-shot 48 returns to its stable state, begins to discharge.

The end of the third pulse in the sample input character is shown to contain marking end distortion which is a retarding or delaying of the mark-to-space transition. When this actual transition does occur, line 20 rises to ground potential and differentiator 22 emits a positive spike which passes through OR gate 26 to trigger one-shot 48. Capacitor 110 attains a full charge and begins to discharge when one-shot 48 returns to its stable state. Because the timing cycle consumes 30% of a unit pulse length and the actual transition here occurs 25% delayed in time, capacitor 110 will complete its discharge after 55% of an ideal pulse length has elapsed. Theoretically, this will occur 5% after the ideal one-half pulse point; however, flip-flop 44 is toggled to its set state at the ideal one-half pulse point and the output of differentiator 38 triggers one-shot 48. Capacitor 110 begins to charge anew and junction point 112 drops to ground. This negative drop is differentiated, and a negative spike is passed by diode 122 to trigger the indicating circuit 54. Distortion has again been detected.

At the ideal one-half pulse point of the fifth information pulse, flip-flop 44 is again toggled to the set state and a positive spike from differentiator 38 passes through OR gate 26 to trigger the one-shot 48. Capacitor 110 in the measuring circuit 52 once again goes through its charge-discharge timing cycle.

The space-to-mark transition at the end of the fifth information pulse, which signifies the beginning of the stop element, is retarded by 25% of a unit pulse. This retarded condition is known as spacing bias. At the actual transition point the line 14 goes positive and differentiator 24 emits a positive spike which triggers one-shot 48. Capacitor 110 accumulates its full charge, one-shot 48 returns to its stable state, and capacitor 110 begins to discharge through resistor 114 to negative battery. Ideally, this discharge is completed after 55% of an ideal pulse has elapsed or 5% after the ideal one-half pulse point; however, at this latter point flip-flop 44, which is in the clear state, is toggled to the set state by oscillator 42. Differentiator 38 sends a spike to trigger the one-shot 48. Capacitor 110 begins to charge anew and junction point 112 drops to ground because of the conducting of diode 116. This negative drop is again differentiated by the combination of capacitor 118 and resistor 120 and a negative triggering spike is passed on line 56 to trigger the indicating circuit 54. Again, the monitoring circuit has detected the presence of a distortion condition in excess of the predetermined or preset distortion limit.

Before 50% of the first unit pulse in the stop element elapsed, character timer 34 completed its timing period and switched back to its original or steady-state condition. This occurred here just prior to the ideal one-half or 50% point of the stop pulse. The inhibit input was removed from differentiator 36. At the 50% point when flip-flop 44 was set by oscillator 42, differentiator 36 functioned simultaneously with differentiator 38 and emitted a spike which cleared flip-flop 32 to end the character timing period. The inhibit input is reapplied to differentiator 38 to prevent its operation until after such time as the next mark-to-space transition occurs. Such transition will signify the start pulse of the following character and a new distortion measurement or character timing period will begin.

The just-described start-stop monitor has detected distortion conditions which would not have been detected by the short pulse monitor described in the aforementioned patent application Ser. No. 348,418, now U.S. Patent No. 3,257,509. This is because each marking and spacing condition in the telegraph character used to illustrate the present invention is longer than a unit pulse duration and the distortion circuit used in the aforementioned application would have been actuated by one transition but would have timed out before the next transition in the pulse train occurred. However, in the present invention three occurrences of distortion, which were here shown to be marking bias, marking end distortion, and spacing bias, were detected. Nevertheless, it should be noted that the present invention is not limited in its application to just long term pulses. It functions equally as well in detecting distortion in reversals or in random pulse groupings.

Although another common type of distortion known as spacing end distortion was not shown, it would also be detected by the present circuit. For example, if between the third and fourth information pulses, the mark-to-space transition had been advanced by 25% rather than retarded by 25%, as shown, the actual transition would have occurred before capacitor 110 and had timed out in response to the timing cycle initiated at the ideal one-half pulse point for the third information pulse. Accordingly, there would have been a charge remaining on capacitor 110, and a distortion signal would have been sent to the indicating circuit 54 at that time.

While all actual transitions are shown as initiating a charge-discharge timing cycle by actuating the monostable trigger means 48, it is evident that distortion detection and measurement does not occur in connection with the start transition. This is a preferred operating technique in which the start-pulse transition is used solely as the reference point in the distortion measurement period, leaving the remaining transitions to effect the distortion measurement. Furthermore, if desired, the start pulse can be inhibited from actuating one-shot 48 and the distortion detection and measurement capability will not be affected because all significant transitions in the pulse train will still actuate one-shot 48.

As described, the present invention functions on a start-stop basis because of the use of internally generated signals which are caused to occur at the ideal one-half points. Note, however, that unlike most start-stop distortion measurement systems, no use is made of generated ideal transition points in the distortion measurement procedure. Instead, a short-pulse technique has been devised which utilizes actual transitions and these generated ideal one-half pulse point signals, yet the ability to detect distortion at each actual transition is retained consistent with start-stop measurements. The fact that in the details of the actual measurement procedure a short-pulse technique is used is seen by reference to FIGURE 2. In the first detection of distortion, which was defined as marking bias, the shortened distance between the midpoint of the first pulse and the end of the first pulse was measured; in the second detection of distortion, which was marking end distortion, the shortened distance between the beginning of the fourth pulse and the midpoint of the fourth pulse was measured; in the third detection of distortion, which was spacing bias, the shortened distance between the beginning of the stop pulse and the midpoint of the first stop element was measured.

What is claimed is:

1. A monitoring device for measuring and indicating the distortion of pulses in a pulse train comprising a timing circuit which is actuated to undergo a timing cycle, monostable trigger means connected to the input of said timing circuit for actuating said timing circuit to initiate said timing cycle, input means for applying transitions in the pulse train to said monostable trigger means, means for generating signals occurring at the ideal one-half pulse points for said pulse train, means for applying said signals to said monostable trigger means, each of said transitions and said signals serving to trigger said monostable trigger means, said timing circuit being actuated by each triggering of said monostable trigger means, and indicating means responsive to the output of said timing circuit for effecting an indication when a transition or generated signal triggers said monostable trigger means to actuate said timing circuit prior to completion of an existing timing cycle.

2. A device as claimed in claim 1 wherein said timing circuit contains an impedance and a capacitor, and said capacitor charges during one portion of said timing cycle when said monostable trigger means is actuated, and discharges through said impedance in another portion of said timing cycle.

3. A device as claimed in claim 2 wherein said impedance is a resistor, said resistor being variable to control the discharge rate of said capacitor and thereby predetermine completion of the timing cycle.

4. A device as claimed in claim 3 wherein said monostable trigger means is a monostable multivibrator having stable and semistable states, said capacitor being charged when said monostable multivibrator is triggered to its semistable state in response to either a transition or generated signal, said monostable multivibrator returning to its stable state to permit discharge of said capacitor through said variable resistor prior to the arrival of the next of said transition or generated signal.

5. A device as claimed in claim 4 wherein said multivibrator includes a charge path for said capacitor, said charge path being completed when said multivibrator is triggered to its semistable state for the first portion of said timing cycle, said charge path being disconnected when said multivibrator returns to its stable state to commence the second portion of said timing cycle in which said capacitor discharges.

6. A device as claimed in claim 5 further comprising timing means for providing a distortion measurement period, said timing means being connected to be actuated by a transition in the pulse train, said signal generating means being synchronized to the actuation of said timing means so that said signals are generated at the one-half ideal pulse points during said distortion measurement period.

7. A device as claimed in claim 6 wherein said pulse train is a telegraph pulse train and said timing means is adjustable to generate a distortion measurement period of a length less than the character length of the characters in said telegraph pulse train, said timing means being actuated by the start transition of said characters.

References Cited

UNITED STATES PATENTS 2,961,489 11/1960 Carver.
3,106,608 10/1963 Britt.
3,324,244 6/1967 Britt, et al.

THOMAS A. ROBINSON, Primary Examiner

M. M CURTIS, Assistant Examiner

U.S. Cl. X.R.

328—162